(12) United States Patent
Janevski et al.

(10) Patent No.: US 7,583,632 B2
(45) Date of Patent: Sep. 1, 2009

(54) EFFICIENT HANDOFFS BETWEEN CELLULAR AND WIRELESS LOCAL AREA NETWORKS

(75) Inventors: Goran Janevski, Nepean (CA); Hamid Syed, Nepean (CA); Bill Gage, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1230 days.

(21) Appl. No.: 10/324,551

(22) Filed: Dec. 20, 2002

(65) Prior Publication Data

US 2004/0008645 A1 Jan. 15, 2004

Related U.S. Application Data

(60) Provisional application No. 60/383,546, filed on May 28, 2002.

(51) Int. Cl.
*H04Q 7/00* (2006.01)
*H04Q 7/24* (2006.01)
*H04L 12/28* (2006.01)

(52) U.S. Cl. .................. 370/331; 370/338; 370/400
(58) Field of Classification Search .............. 370/331, 370/338, 400
See application file for complete search history.

(56) References Cited

U.S. PATENT DOCUMENTS

| 6,985,464 | B2* | 1/2006 | Harper et al. ............. 370/331 |
| 7,068,624 | B1* | 6/2006 | Dantu et al. .............. 370/331 |
| 7,116,668 | B2* | 10/2006 | Sivalingham ............. 370/394 |
| 7,254,119 | B2* | 8/2007 | Jiang et al. .............. 370/328 |
| 2002/0021681 | A1 | 2/2002 | Madour ................... 370/331 |
| 2002/0191572 | A1 | 12/2002 | Weinstein et al. ......... 370/338 |
| 2003/0021252 | A1* | 1/2003 | Harper et al. ............. 370/338 |
| 2003/0104814 | A1* | 6/2003 | Gwon et al. .............. 455/436 |
| 2003/0204599 | A1* | 10/2003 | Trossen et al. ........... 709/227 |
| 2004/0114553 | A1* | 6/2004 | Jiang et al. .............. 370/328 |
| 2005/0254469 | A1* | 11/2005 | Verma et al. ............. 370/338 |
| 2008/0101291 | A1* | 5/2008 | Jiang et al. .............. 370/331 |

FOREIGN PATENT DOCUMENTS

| WO | WO 01/67786 A2 | 9/2001 |
| WO | WO 02/17561 A2 | 2/2002 |
| WO | WO 03/030460 A2 | 4/2003 |

* cited by examiner

*Primary Examiner*—Andrew Lee
(74) *Attorney, Agent, or Firm*—Withrow & Terranova, P.L.L.C.

(57) ABSTRACT

The present invention facilitates a handoff between cellular and wireless local area networks (WLANs). To facilitate a WLAN interface with the cellular network, a proxy packet control function (P-PCF) establishes a data tunnel to a packet data serving node (PDSN), as well as a WLAN association with a mobile terminal. The WLAN association is a tunnel, and is preferably implemented via an Access Router acting as a liaison between the proxy PCF and an Access Point. The Access Router and the proxy PCF establish an IP tunnel, which carries the WLAN user's PPP traffic. Handoffs between the cellular and WLAN networks are facilitated by effecting a same-PDSN, inter-PCF handoff wherein the communication session with the mobile terminal is effectively changed from between the PDSN and the proxy PCF to between the PDSN and a PCF associated with a base station controller facilitating the cellular access, and vice versa.

30 Claims, 17 Drawing Sheets

EFFICIENT HANDOFFS BETWEEN CELLULAR AND WIRELESS LOCAL AREA NETWORKS

This application claims the benefit of provisional patent application Ser. No. 60/383,546 filed May 28, 2002, the disclosure of which is hereby incorporated by reference in its entirety.

FIELD OF THE INVENTION

The present invention relates to wireless communications, and in particular to facilitating handoffs between different wireless communication technologies, such as cdma2000 and 802.11 based wireless area networks.

BACKGROUND OF THE INVENTION

The continued growth of wireless communications has led to traditional cellular networks facilitating data and voice communications with various types of mobile terminals, such as mobile telephones, personal digital assistants, and personal computers configured with appropriate wireless modems. Recently, wireless local area networks (WLANs) have come to fruition, and are expanding at a rapid rate. Typically, personal computers and like computing devices are equipped with wireless modems to facilitate wireless communications between the computing device and one or more Access Points, which facilitate wireless communications with the computing device and a traditional local area network.

In addition to the introduction of WLAN standards (IEEE 802.1a/b/g), cellular standards (CDMA, UMTS) are evolving to facilitate data communication; however, none of these standards are compatible at a radio interface level with those used for WLANs. At the same time, users increasingly need an "always on" data communication ability regardless of their location. Cellular wireless networks and WLANs complement each other, in terms of where they provide coverage: cellular wireless networks are ubiquitous, whereas WLANs currently only provide spot coverage—albeit often in places where the cellular wireless radio signal has difficulty penetrating, such as inside buildings and in underground public transport stations. As users move from a coverage area of one radio technology into a coverage area of another radio technology, radio coverage of the two technologies could in some cases overlap, and in others not. Where radio coverage does not overlap, there is a clear benefit to being able to switch from one radio technology to the other when the coverage or radio signal changes. Even in the cases where the radio coverage overlaps, by switching radio technology, users could benefit from the higher throughput offered currently by any one of the WLAN radio technologies compared to any one of the cellular radio technologies. In this kind of an integrated, dual-radio and in general, multi-radio environment, there is a need to provide an efficient and uninterrupted transition from being serviced by one radio technology to being serviced by another radio technology. Such a transition is referred to as an inter-technology handoff.

Accordingly, there is a need for a technique to facilitate handoffs between cellular networks and WLANs in an efficient and effective manner. Further, there is a need to minimize the impact of handoffs on existing network infrastructures to minimize the implementation cost for a system capable of providing such handoffs. Finally, there is a need to minimize the impact of the handoff mechanism on the existing cellular and WLAN standards.

SUMMARY OF THE INVENTION

The present invention facilitates a handoff between cellular and wireless local area networks (WLANs) without requiring modification of the cellular network. To facilitate a WLAN interface with the cellular network, a proxy packet control function (P-PCF) is provided to establish a data tunnel to a packet data serving node (PDSN), as well as to establish a WLAN association with a mobile terminal. In a layer 3/Internet Protocol (IP) network, the WLAN association is a tunnel, and is implemented via an Access Router acting as a liaison between the proxy PCF and an Access Point. The Access Router and the proxy PCF establish an IP tunnel, which carries the WLAN user's PPP traffic. Handoffs between the cellular and WLAN networks are facilitated by effecting a same-PDSN, inter-PCF handoff wherein the communication session with the mobile terminal is effectively changed from between the PDSN and the proxy PCF to between the PDSN and a PCF associated with a base station controller facilitating the cellular access, and vice versa.

For a handoff from a cellular network to a WLAN, the mobile terminal will recognize the presence of the WLAN and send a signal that is ultimately provided to the proxy PCF, which will effect a handoff. This mobile signal also causes the proxy PCF and the Access Router to establish a WLAN association. The handoff is implemented by having the PDSN tear down a data tunnel established for the data communication session between the PDSN and the PCF of a Base Station Controller (BSC), and establish a new data tunnel for the communication session between the PDSN and the proxy PCF, both on behalf of the mobile terminal. Prior to the establishment of the new data tunnel, a WLAN association is established between the mobile terminal and the proxy PCF, via an Access Router and an Access Point in traditional fashion. The WLAN association and the new data tunnel are associated in the proxy PCF to form a communication link for the communication session between the PDSN and the mobile terminal.

For a handoff from the WLAN to the cellular network, the mobile terminal will decide that the WLAN signal strength is no longer satisfactory, and therefore direct the data stream towards its cellular radio interface. This is done in the same fashion as in intra-cellular handoffs, just as if it were transitioning from one BSC/PCF to another, wherein a radio channel is set up between the base station controller and the mobile terminal. The PCF associated with the base station controller and the PDSN will establish a tunnel therebetween, wherein the data tunnel is associated with the radio channel to provide a communication link for the communication session between the PDSN and the mobile terminal. Prior to establishing the data tunnel between the PDSN and the PCF of the base station controller, the original data tunnel between the proxy PCF and the PDSN is torn down, using the same-PDSN, inter-PCF handoff procedure. As such, when the old data channel is torn down and the new data channel is established, packets or frames of data may be transmitted back and forth between the mobile terminal and the PDSN to effect the communication session.

Preferably the handoff mechanism described herein applies to cdma2000 cellular networks and its successors, 1xEV-DO and 1xEV-DV cellular networks, cdma2000, and any one of the WLAN 802.11 standards (a, b, or g). As such, the point-to-point protocol (PPP) is used to effect data communications between the PDSN and the mobile terminal. The cdma2000 and 802.11 standards are incorporated herein by reference.

In one embodiment, the handoff is executed at the radio link layer, in a manner such that the PPP communication session between the mobile terminal and the PDSN is maintained before, during, and after the handoff occurs to provide a seamless handoff. That is, the original PPP session, as established initially between the mobile terminal and the PDSN, and regardless of whether it was initiated via the cellular radio interface or the WLAN radio interface, is preserved during an unlimited number of these inter-technology handoffs. For a handoff from a WLAN to a cellular network, the mobile terminal may be configured to provide additional information, such as a bit or flag, indicating that an inter-technology handoff is occurring to allow a more efficient handoff or to allow the mobile terminal to be out of a dormant mode when the handoff occurs. In the cdma2000 standard, the present invention works well with both the simple IP and mobile IP modes of operation, and as noted, requires little or no change in the cellular network.

The mobile terminal facilitates the handoff by being able to sense the presence or ability to communicate with a WLAN or cellular network by sensing the presence or strength of signals being transmitted from the WLAN or cellular network and determines when to send a signal to either of the networks to initiate a handoff. The sensing and switching logic used to facilitate such action will effectively cooperate with different interfaces capable of interacting with the cellular network as well as the WLAN.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
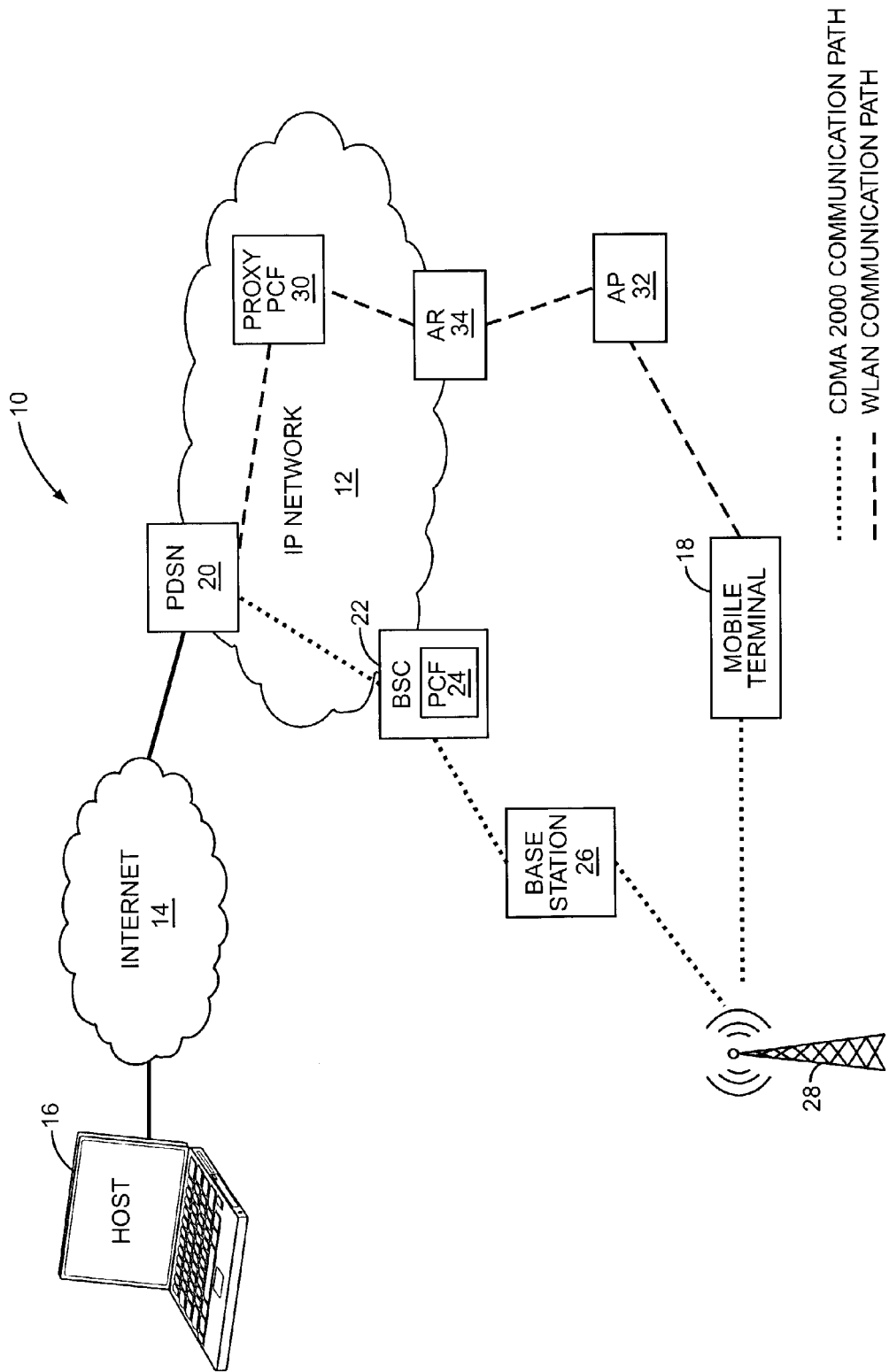
FIG. 1 is a block representation of a communication environment in which one embodiment of the present invention may be implemented.

The present invention provides a technique for facilitating handoffs between different wireless communication technologies capable of providing communication services to mobile terminals, such as mobile telephones, personal computers, personal digital assistants, and the like. The present invention is particularly beneficial in allowing existing, data-capable cellular communication networks to effectively support wireless local area networks (WLANs). Referring now to FIG. 1, a communication environment 10 is illustrated having one or more centralized packet networks, such as an Internet Protocol (IP) network 12 and the Internet 14. These networks, in combination with associated cellular networks, cooperate to facilitate communications between a host device 16, such as a desktop personal computer, and a mobile terminal 18, which may take various forms as described above. An exemplary cellular communication network technology is the 1xRTT/cdma2000 standard, which will be referred to as cdma2000 hereinafter.

In the illustrated example, communications between the host 16 and the mobile terminal 18 are established using multiple connections over multiple networks. For example, a packet data serving node (PDSN) 20 may facilitate communications between the host 16 and a base station controller (BSC) 22 of a cdma2000 network, which is not specifically labeled. The BSC 22 will preferably include a packet control function (PCF) 24 to establish a connection and facilitate communications with the mobile terminal 18 through an appropriate base station 26 and associated antenna 28 in traditional fashion. The dotted line in FIG. 1 illustrates the communication path between the PDSN 20 and the mobile terminal 18, when communications are facilitated using the cdma2000 network and communication standard.

In contrast, the dashed line represents the communication path between the mobile terminal 18 and the PDSN 20 when WLAN access is provided. In the preferred embodiment, a communication device referred to as a proxy PCF 30 is provided to appear as a PCF 24 in a BSC 22 to the PDSN 20. The proxy PCF 30 effectively provides an interface between the cdma2000 infrastructure and the WLAN infrastructure. As such, the proxy PCF 30 also facilitates communications between the PDSN 20 and the mobile terminal 18 by establishing communication sessions with the PDSN 20 in a fashion identical to that of the PCF 24, as well as establishing communications with an Access Point (AP) 32 via an Access Router (AR) 34 to facilitate WLAN communications with the mobile terminal 18. With this infrastructure, the present invention effectively and efficiently provides for handoffs between direct cdma2000 support and WLAN support of the mobile terminal 18 without requiring significant amounts of additional infrastructure.

Preferably, the WLAN access is based on the IEEE 802.11 wireless local area network standards, which facilitate a short-radius radio technology. The present invention allows for the cdma2000 standard, or other like communication standard that does not recognize IEEE 802.11 communication, to be easily modified to not only facilitate communications with IEEE 802.11 devices, but also facilitate efficient handoffs between the two technologies.

In general, assume that the point-to-point protocol (PPP) is used to facilitate communications between the PDSN 20 and the mobile terminal 18. PPP sessions are established between the mobile terminal 18 and the PDSN 20 over different physical layers as will be described below. Communication sessions between the PDSN 20 and another device, such as the host 16, are established in traditional fashion, such as using the Internet Protocol.

Figure 2:
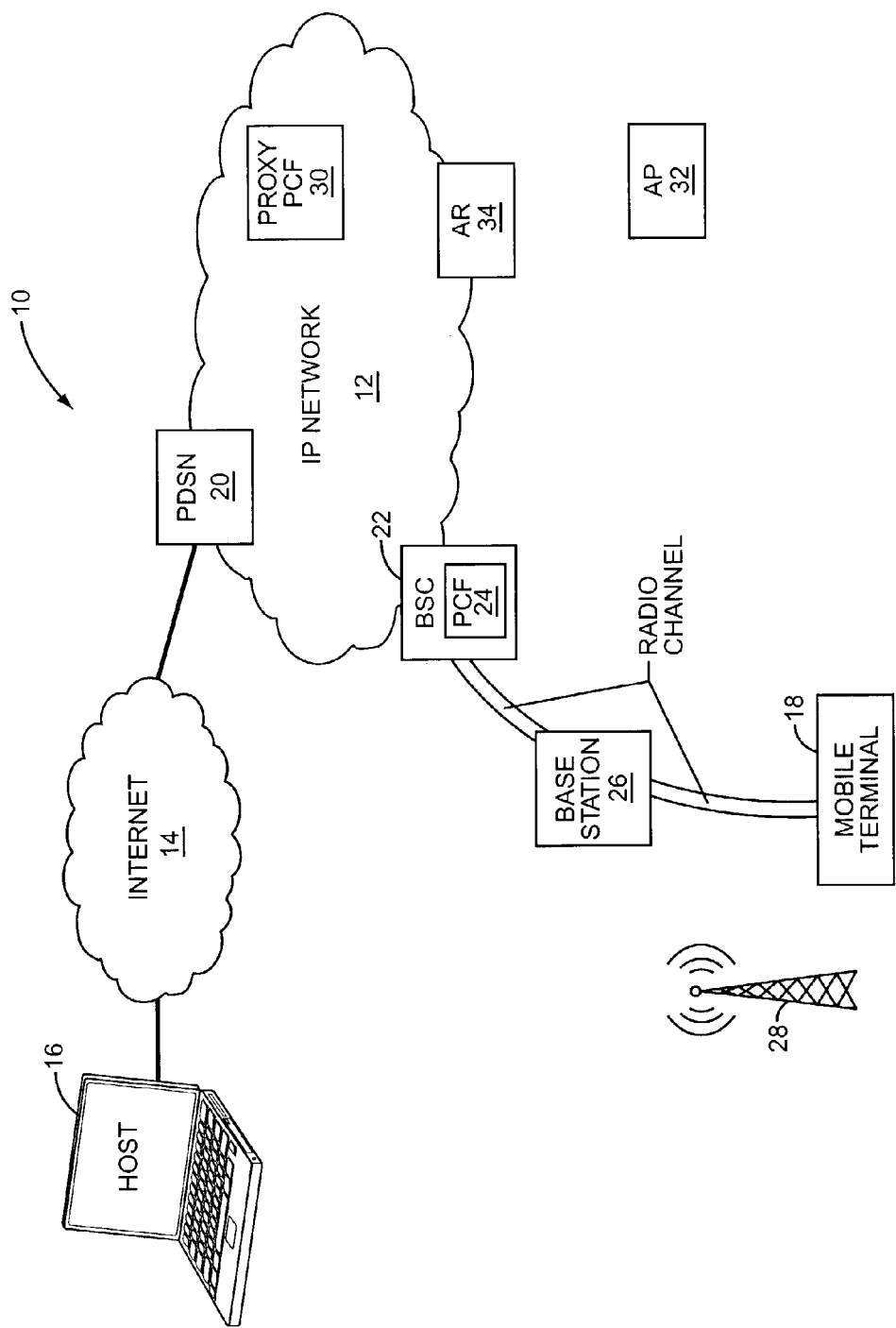
FIGS. 2-4 illustrate the establishment of wireless communications via a cellular network according to one embodiment of the present invention.

In an effort to provide comprehensive understanding of the present invention, FIGS. 2-16 illustrate in a step-wise fashion the establishment of a standard cdma2000 communication session between the mobile terminal 18 and the host 16, followed by a handoff from the direct cdma2000 wireless interface to the WLAN interface, a handoff from the WLAN interface to the cdma2000 interface, and finally the origination of a communication session via the WLAN access interface. With particular reference to FIG. 2, assume a mobile terminal 18 is configured to establish a communication session with a host 16. Initially, the mobile terminal 18 will send a signal to the base station 26 to request a radio channel, which is traditionally done in an initial data session setup or a dormant-to-active transition, and which will trigger the establishment of a communication session with the mobile terminal 18 based on the cdma2000 standard. The base station 26 will send an origination message to the BSC 22, which will set up a cdma2000 radio channel specifically for the mobile terminal 18, as well as establish a connection with the PCF 24.

Figure 3:
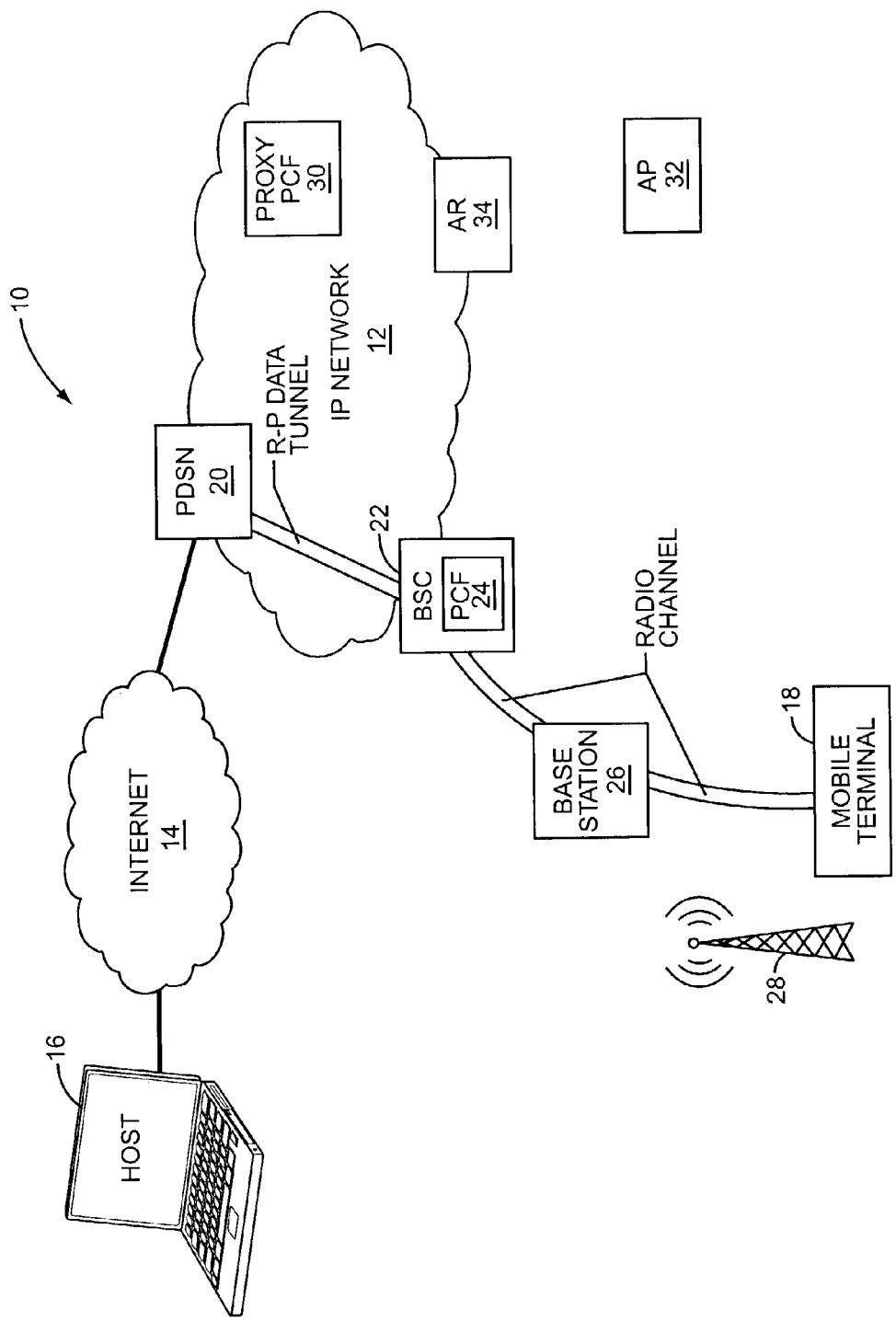
Figure 4:
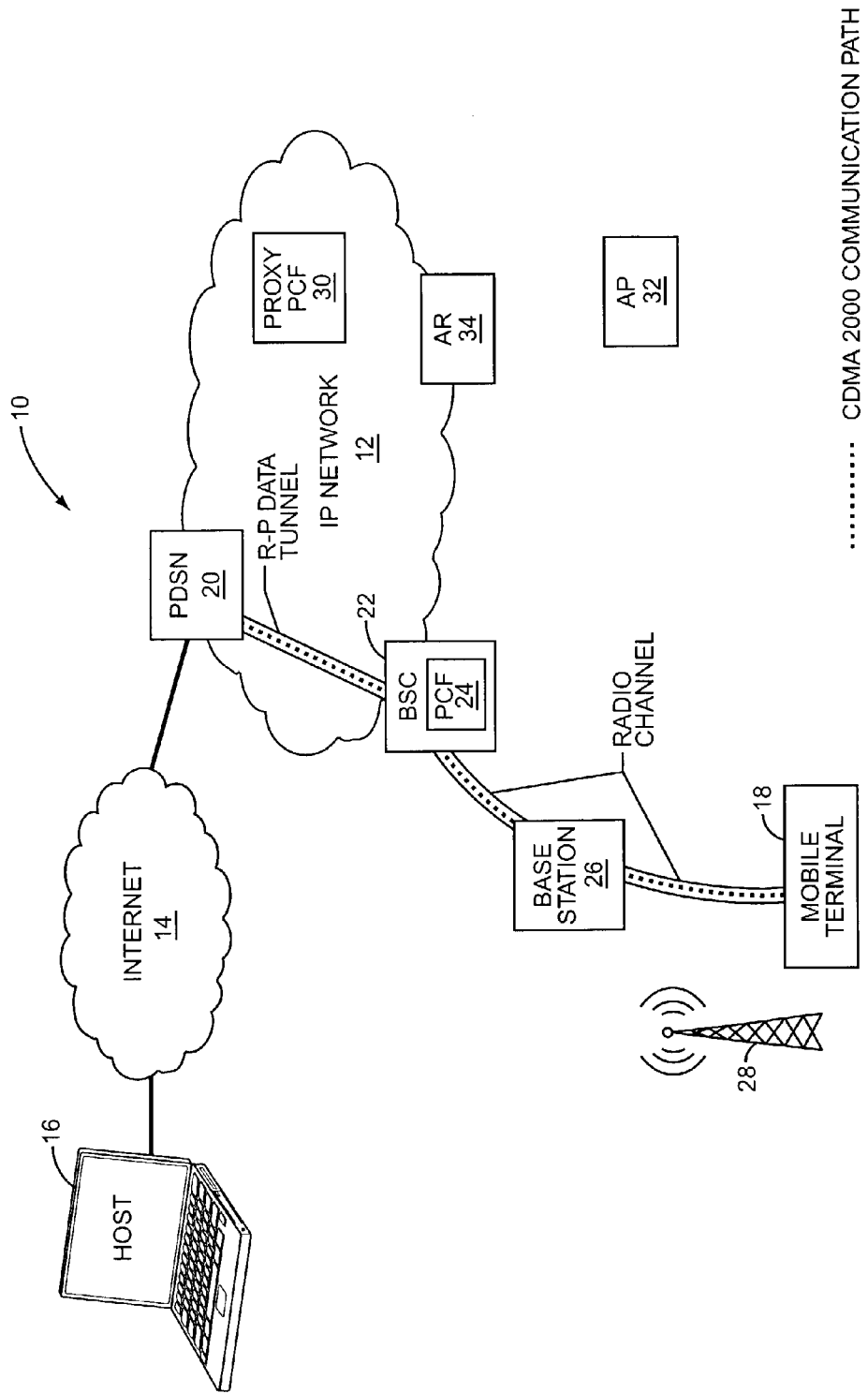

As shown in FIG. 3, the BSC 22 and the PDSN 20 will communicate with one another regarding the requested session by the mobile terminal 18 to trigger the PDSN 20 to establish an R-P data session between the PDSN 20 and the PCF 24 such that a communication session is established between the mobile terminal 18 and the PDSN 20. The R-P data session between the PDSN 20 and the BSC 22/PCF 24 and the radio channel between the BSC 22 and the mobile terminal 18 facilitate both uplink and downlink data communications between the mobile terminal 18 and the PDSN 20. At this point, a traditional cdma2000 communication session using PPP is established between the PDSN 20 and the mobile terminal 18, as shown in FIG. 4. Notably, the cdma2000 standard provides for various authentication techniques prior to establishing the PPP session between the mobile terminal 18 and the PDSN 20, as will be recognized by those skilled in the art.

Preferably, the mobile terminal 18 is configured with at least two different communication interfaces, one for communicating with the base station 26 via the antenna 28 for traditional cdma2000 access, and another for WLAN access. The mobile terminal 18 will preferably include radio technology sensor and switcher (RTSS) logic to facilitate the operation and interaction between these interfaces. The primary functions of the RTSS are to cooperate with the various interfaces to aid in determining which interface to use for communications and control the transition from one interface to another during a handoff.

Figure 5:
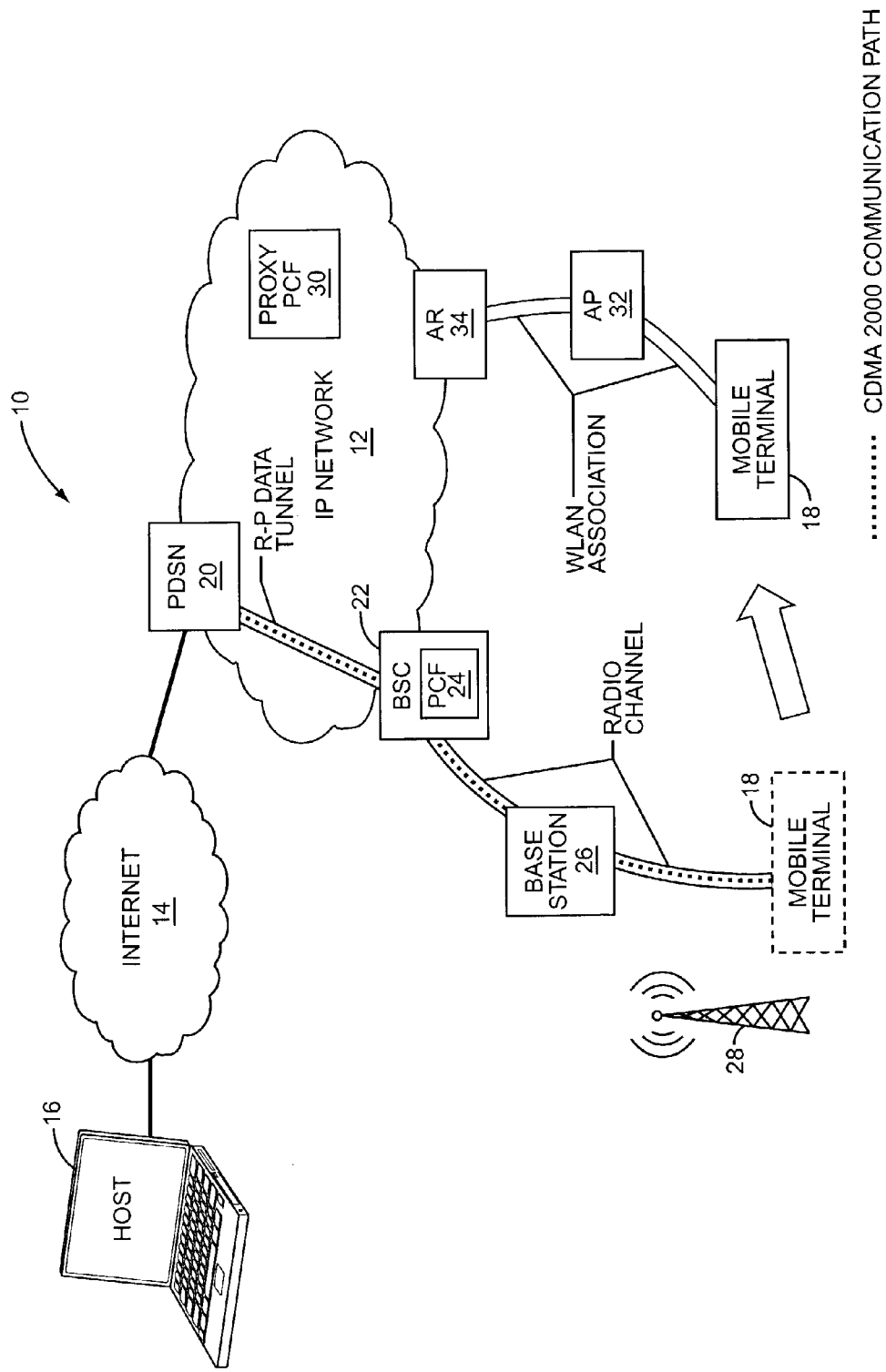
FIGS. 5-8 illustrate a handoff of communication services from a cellular network to a wireless local area network (WLAN) according to one embodiment of the present invention.

As illustrated in FIG. 5, the mobile terminal 18 may transition from an area better served by direct CDMA access to one capable of being served via WLAN access via the Access Point 32. As the mobile terminal 18 comes in closer proximity to the Access Point 32, the RTSS will determine a time when it is best to initiate a transition from using the cdma2000 interface to using the WLAN interface and thereby facilitate a communication session with the host 16 via the Access Point 32 using 802.11 instead of cdma2000. Essentially, the RTSS in the mobile terminal 18 will detect the presence and the strength of the WLAN signal from the Access Point 32, and send a message directed to the proxy PCF 30 via the Access Point 32 and the Access Router 34 to indicate that the mobile terminal 18 is within the coverage area of the Access Point 32 and initiate a handoff. The Access Router 34 and Access Point 32 will cooperate with the mobile terminal 18 to facilitate WLAN access authentication. The Access Router also establishes a tunnel with the proxy-PCF to facilitate a communication session between the Access Router 34 and the proxy PCF 30 by carrying PPP frames in both directions. The proxy PCF 30 will initiate an intra-PDSN, inter-PCF handoff with the PDSN 20 that is currently serving the mobile terminal 18. Since the proxy PCF 30 appears the same as any other PCF 24 provided by a BSC 22, the PDSN 20 does not necessarily have to realize that the handoff taking place will result in the mobile terminal 18 using a different access technology.

Figure 6:
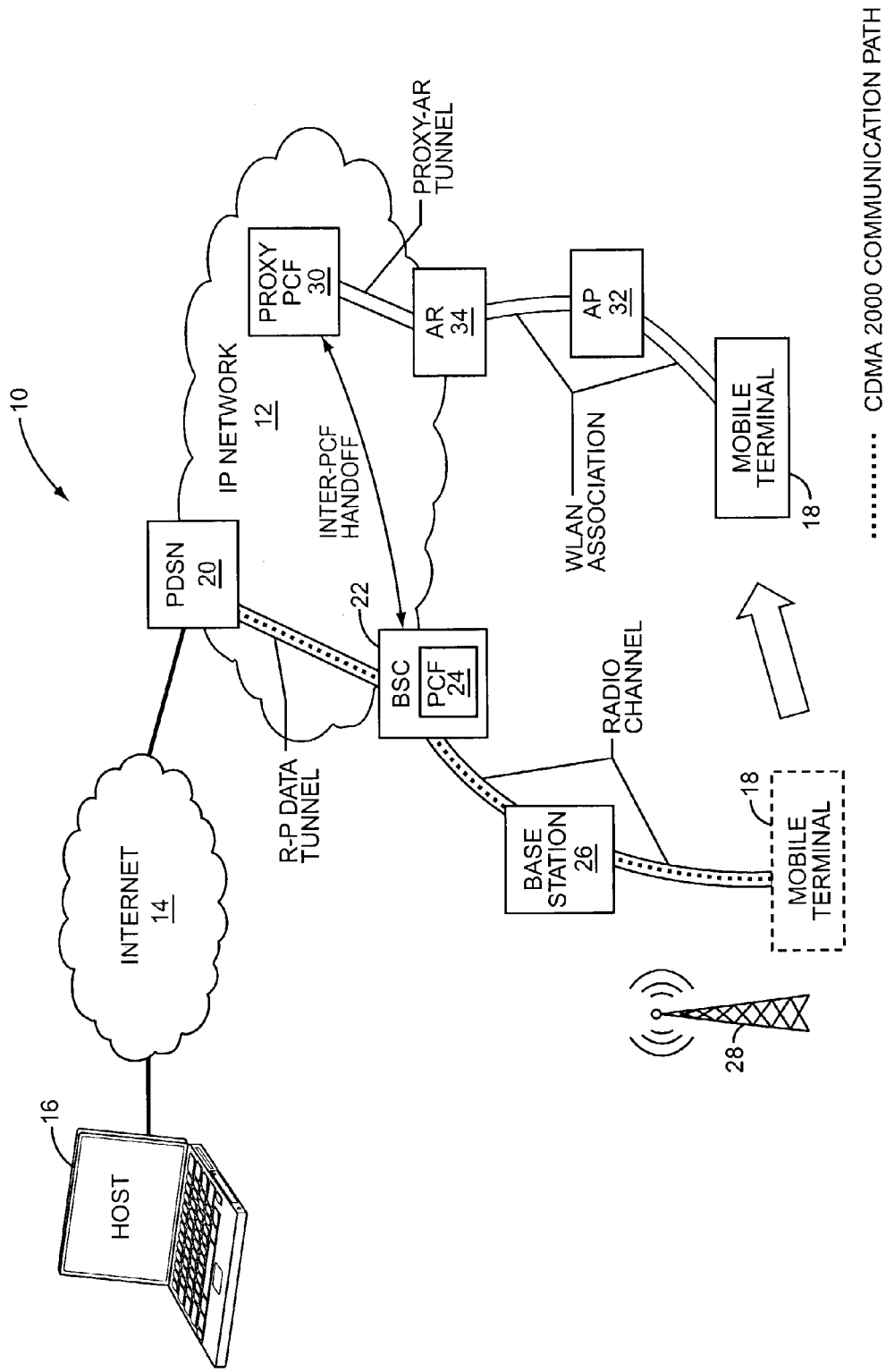
Figure 7:
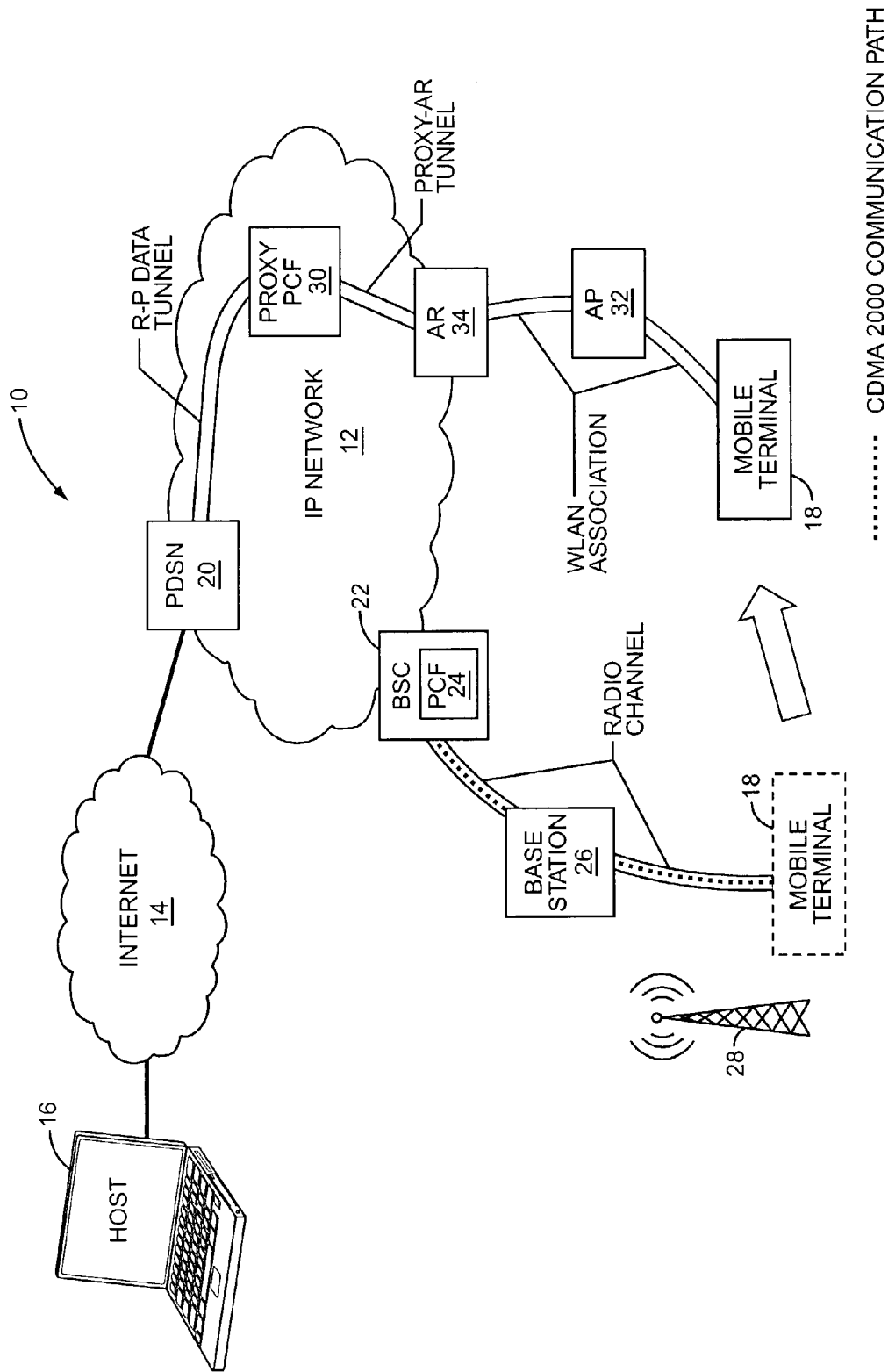

In any event, the PDSN 20 performs the inter-PCF handoff from the PCF 24 to the proxy PCF 30 as indicated in FIG. 6. The effect of the handoff is to create a new R-P data session between the PDSN 20 and the proxy PCF 30, and move the existing PPP session associated with the mobile terminal 18 to the newly created R-P data session. Once the PPP session has been reassociated with the new R-P data session, the PDSN 20 will tear down the original R-P data session, as illustrated in FIG. 7. In general, the PPP session will be associated with an ID and the proxy PCF 30 will create a mapping between the ID and the session ID associated with the R-P data session. The proxy PCF 30 will also create a tunnel with the Access Router 34 on behalf of the mobile terminal 18 and associate a proxy PCF-AR tunnel ID with the R-P session ID such that the tunnels on both sides of the proxy PCF 30 are associated and an overall PPP session may be established between the PDSN 20 and the mobile terminal 18, as illustrated in FIG. 8.

Figure 8:
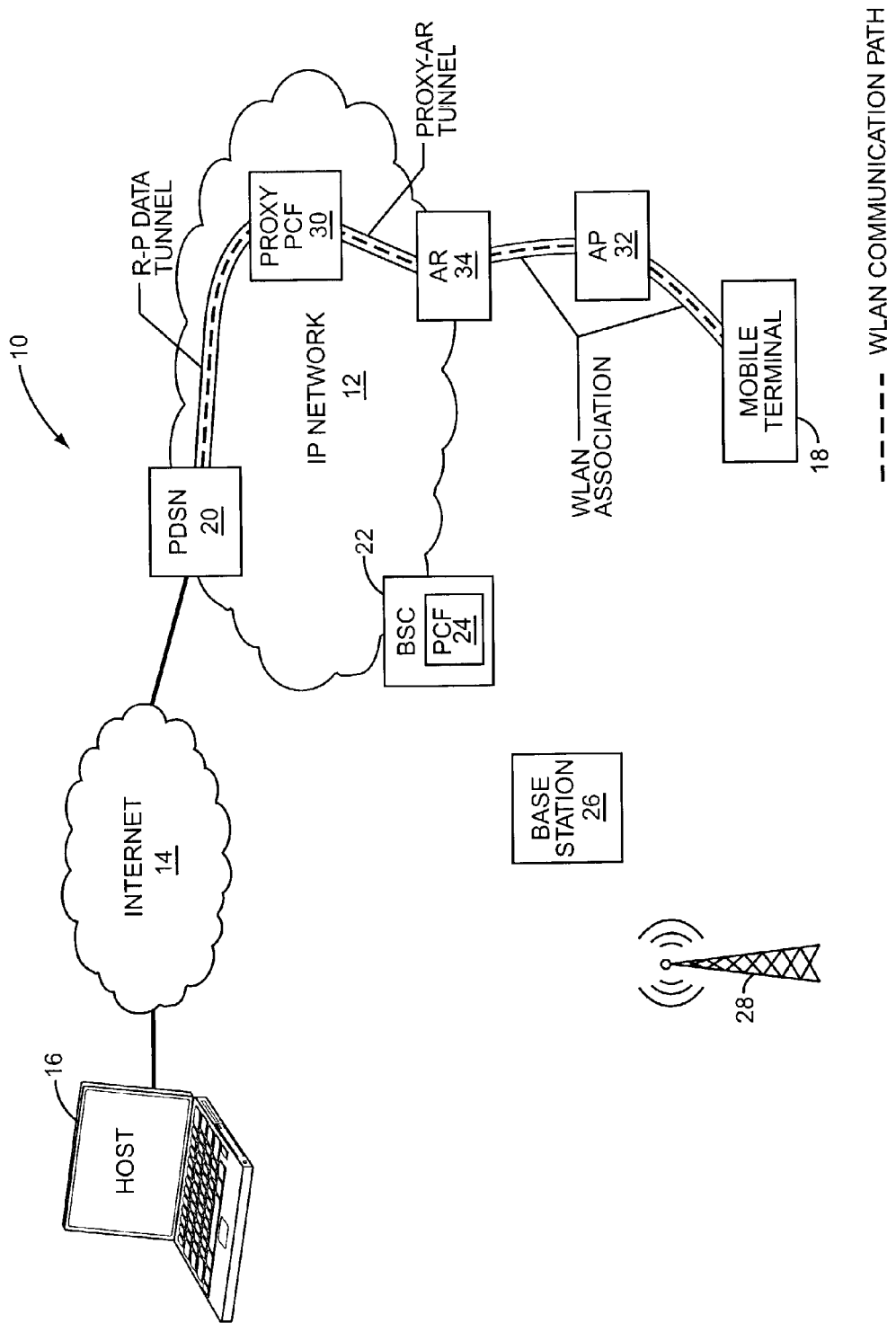

Continuing with FIG. 8, in general, IP packets originated by the mobile terminal 18 are encapsulated into PPP frames for the PPP session and are sent to the Access Router 34 via the Access Point 32. The Access Router 34 tunnels the PPP frames to the proxy PCF 30, which decapsulates the PPP frames, and then encapsulates them into the R-P data session associated with the mobile terminal 18 for delivery to the PDSN 20. The PDSN 20 decapsulates the data from the R-P data session to recover the original IP packets, which are delivered to the host 16 in traditional IP fashion. IP packets that originate at the host 16 travel in an opposite path.

Figure 9:
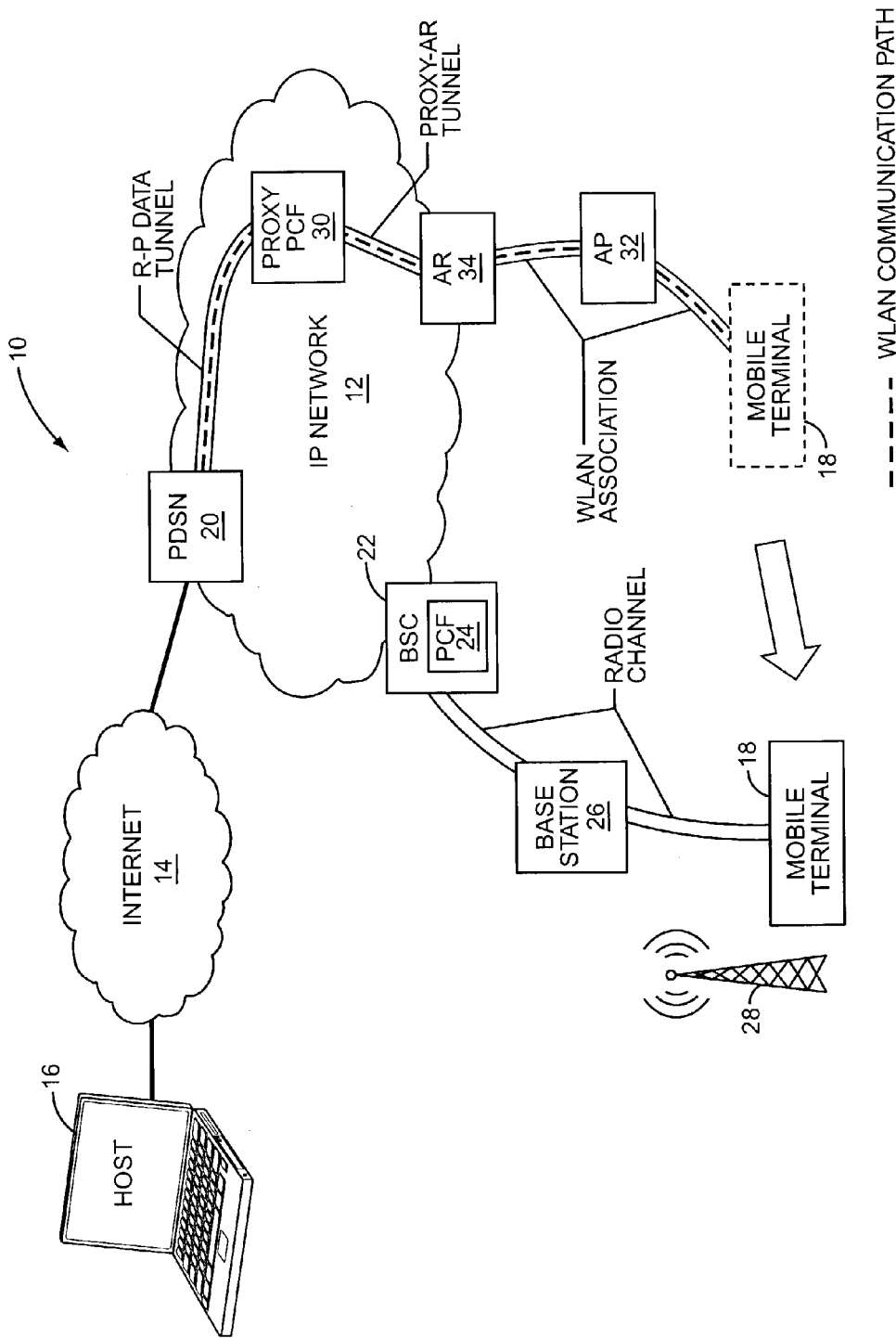
FIGS. 9-12 illustrate a handoff from the WLAN back to the cellular network according to one embodiment of the present invention.
Figure 10:
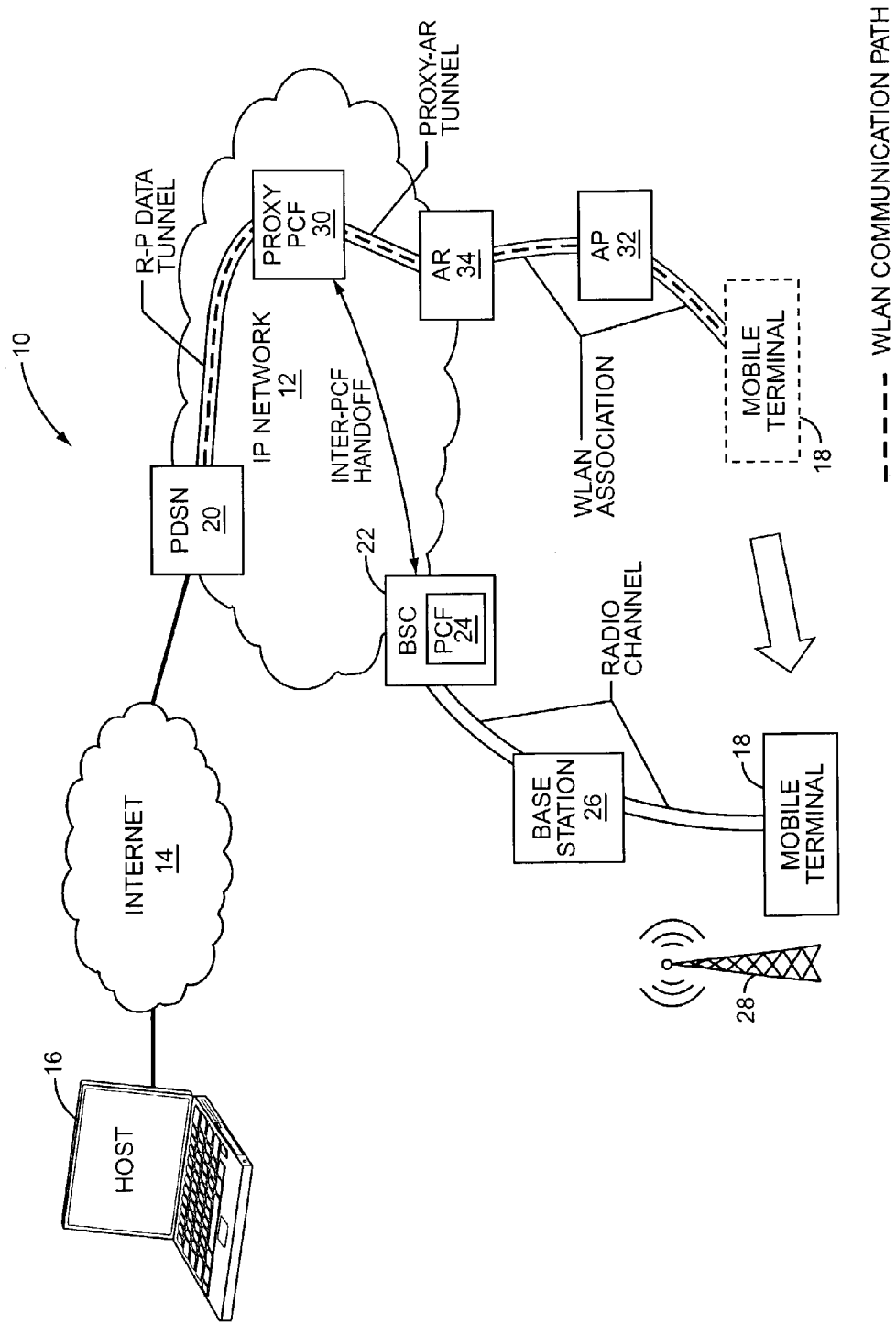
Figure 11:
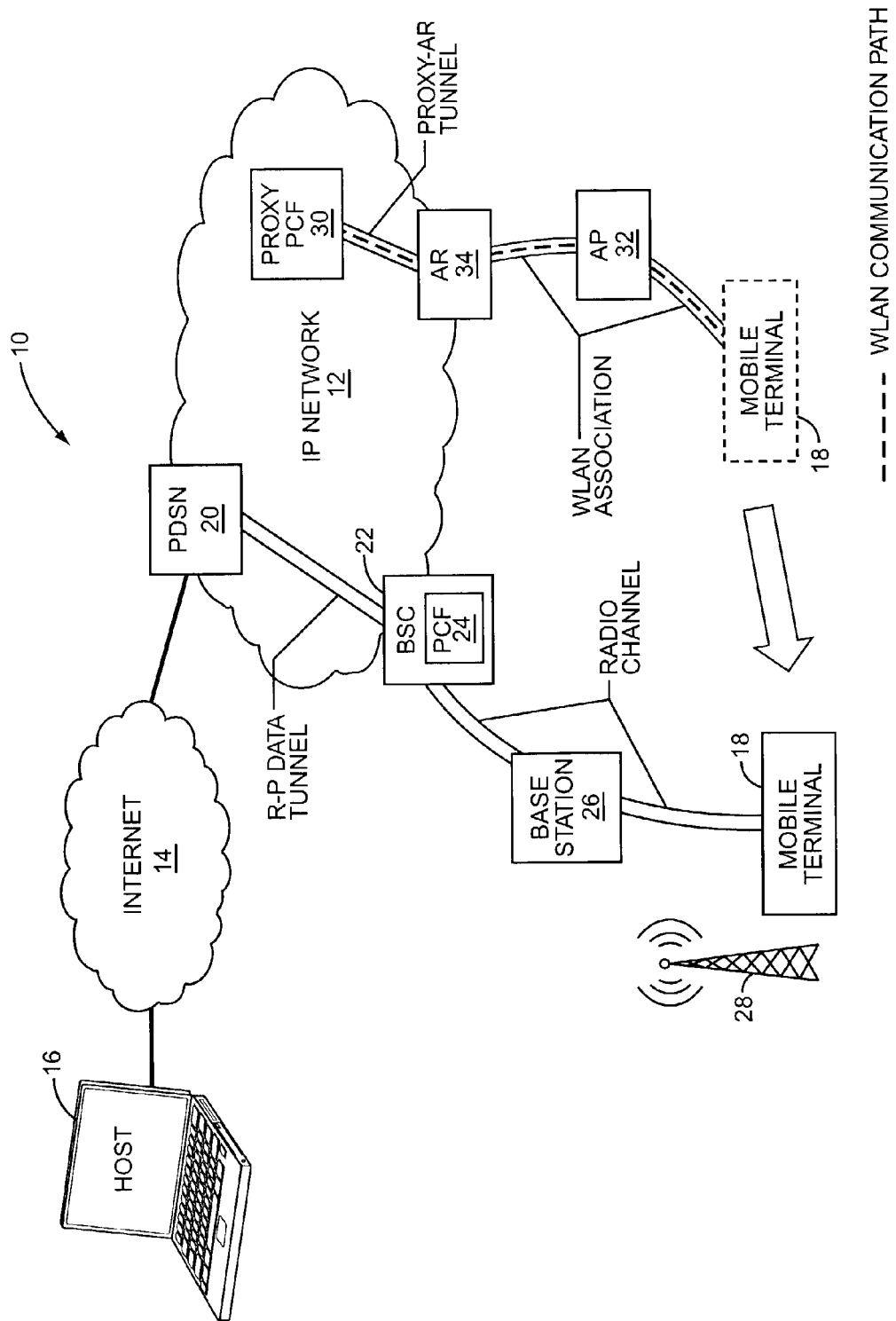
Figure 12:
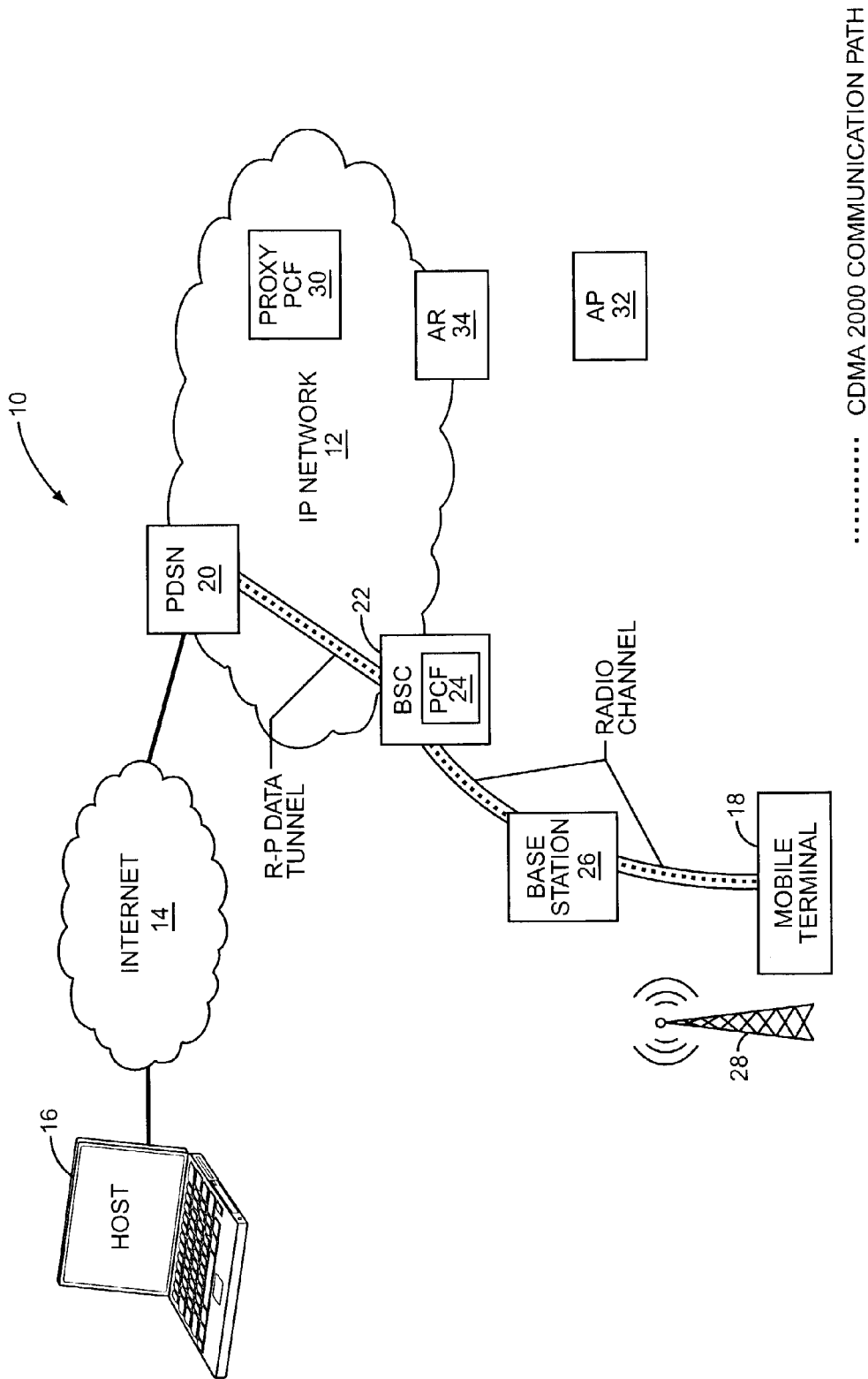

Turning now to FIG. 9, the process of facilitating a handoff from WLAN access to direct cdma2000 access is described. As the mobile terminal 18 begins to leave the coverage area provided by the Access Point 32, the RTSS will detect the loss or fading of the WLAN radio signal. In one embodiment, the RTSS will assure that the cdma2000 interface is dormant or inactive, and then trigger a dormant-to-active transition procedure via the cdma2000 interface according to the cdma2000 standard. The base station 26 will receive the trigger and send an origination message to the BSC 22, which will set up a radio channel for the mobile terminal 18 as well as a corresponding connection with the PCF 24. As illustrated in FIG. 10, the PCF 24 initiates an intra-PDSN, inter-PCF handoff with the PDSN 20 serving the mobile terminal 18. The PDSN 20 will perform the inter-PCF handoff by creating a new R-P data session between the PDSN 20 and the BSC 22 and will then move the existing PPP session between the PDSN 20 and the proxy PCF 30 to the newly created R-P data session between the PDSN 20 and the PCF 24, as illustrated in FIG. 11. Next, the PDSN 20 will tear down the previous R-P session between the PDSN 20 and the proxy PCF 30 while the proxy PCF 30 tears down the proxy-AR tunnel between the proxy PCF 30 and the Access Router 34. At this point, a handoff from the WLAN access to the cdma2000 access has been facilitated, wherein the mobile terminal 18 is directly served by cdma2000 access via the base station 26 and BSC 22 via the PCF 24, as illustrated in FIG. 12.

Notably, the proxy PCF 30 hides the WLAN from the PDSN 20 and presents itself to the PDSN 20 as any other PCF, such as the PCF 24 in the BSC 22. Thus, the cdma2000 standard for handoff between BSCs 22 is all that is needed to facilitate handoffs between the cdma2000 BSC 22 and the WLAN access. In essence, the WLAN network interface is hidden from the cdma2000 network by the proxy PCF 30, which appears to the PDSN 20 as any other cdma2000 PCF 24. Accordingly, WLAN access is appended to a cdma2000 network via the addition of a proxy PCF 30 and an appropriate cooperation with the proxy PCF 30 and corresponding Access Routers 34 and Access Points 32 to facilitate WLAN access.

Figure 13:
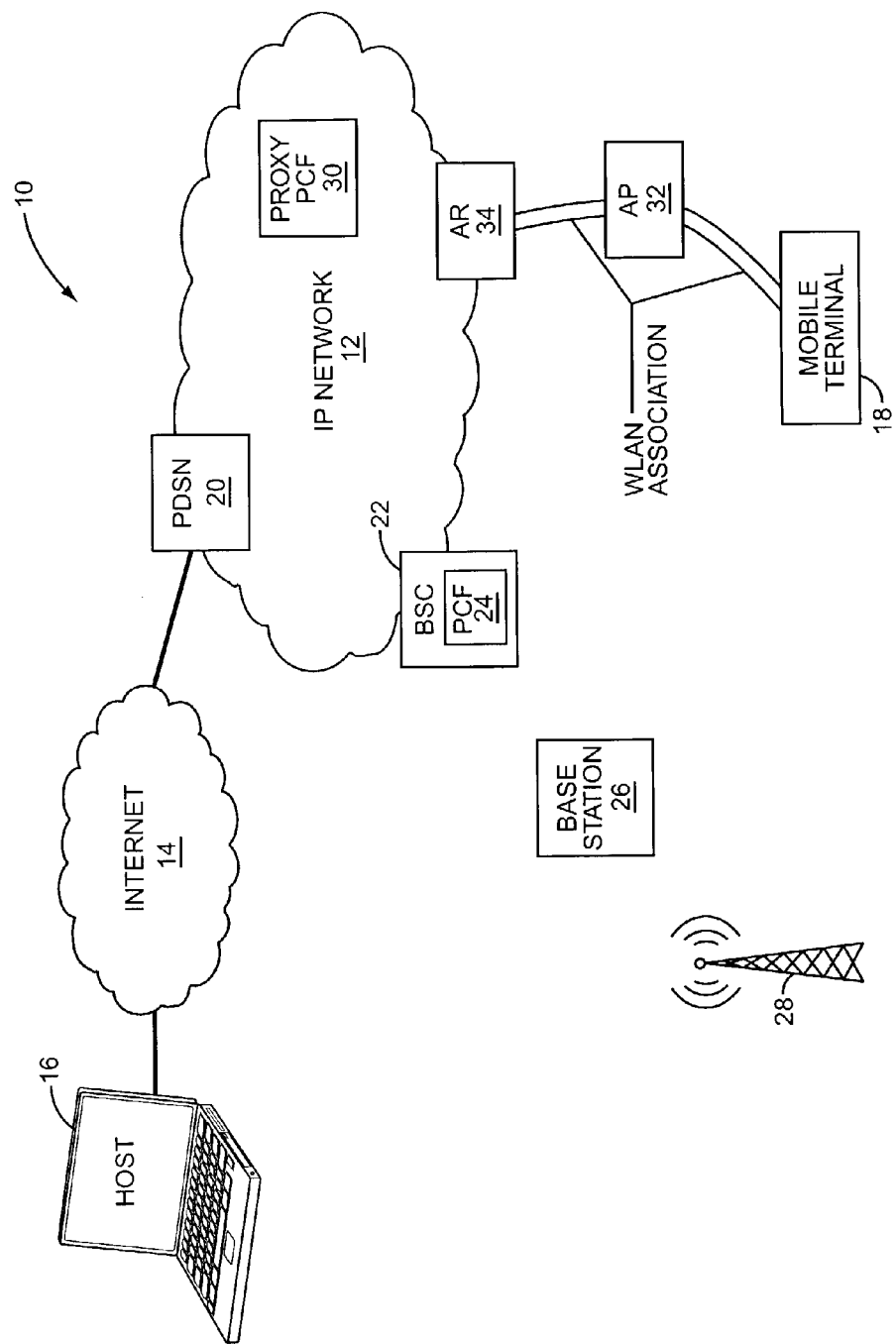
FIGS. 13-16 illustrate the origination of wireless communications via a WLAN according to one embodiment of the present invention.
Figure 14:
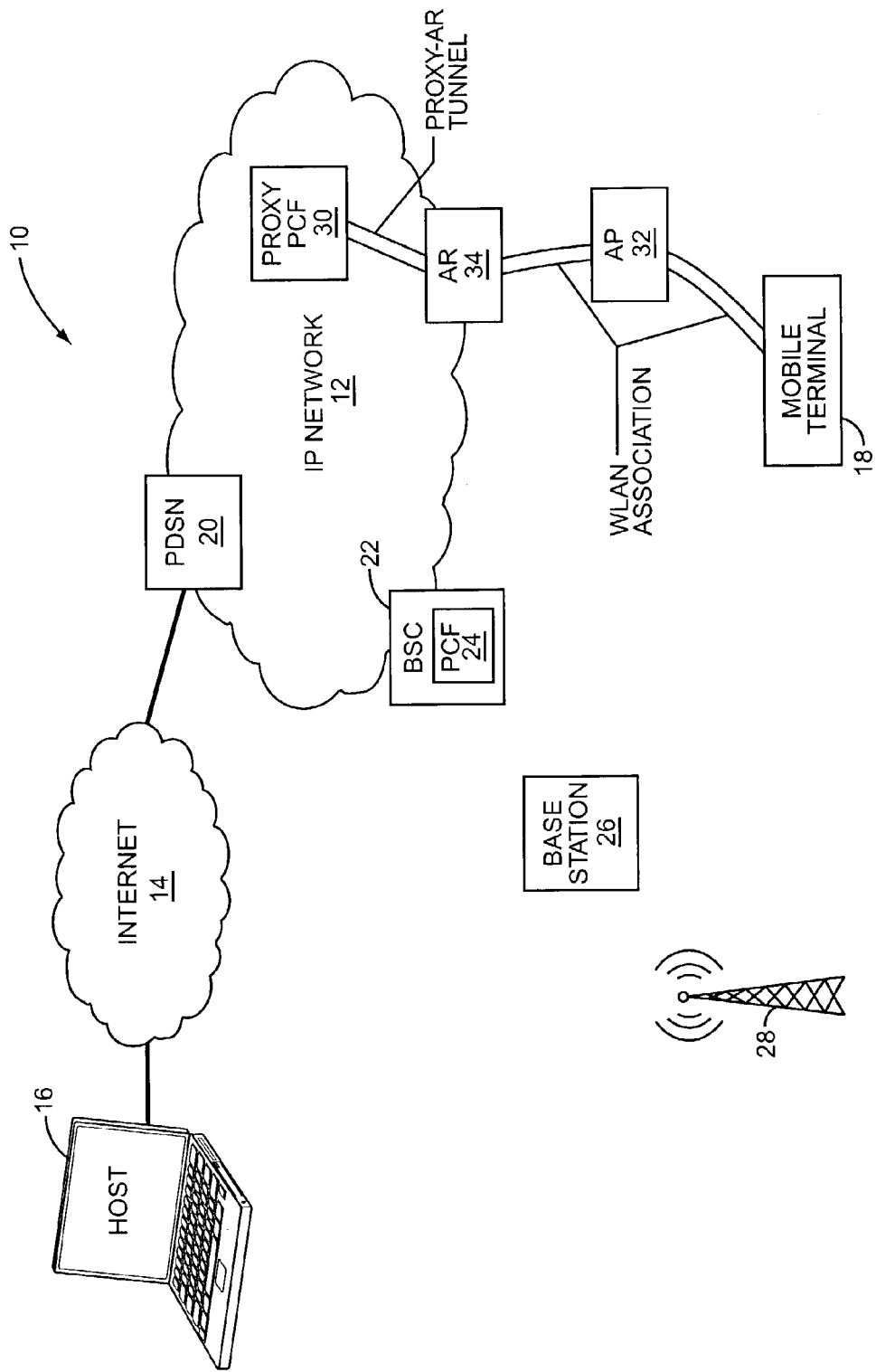
Figure 15:
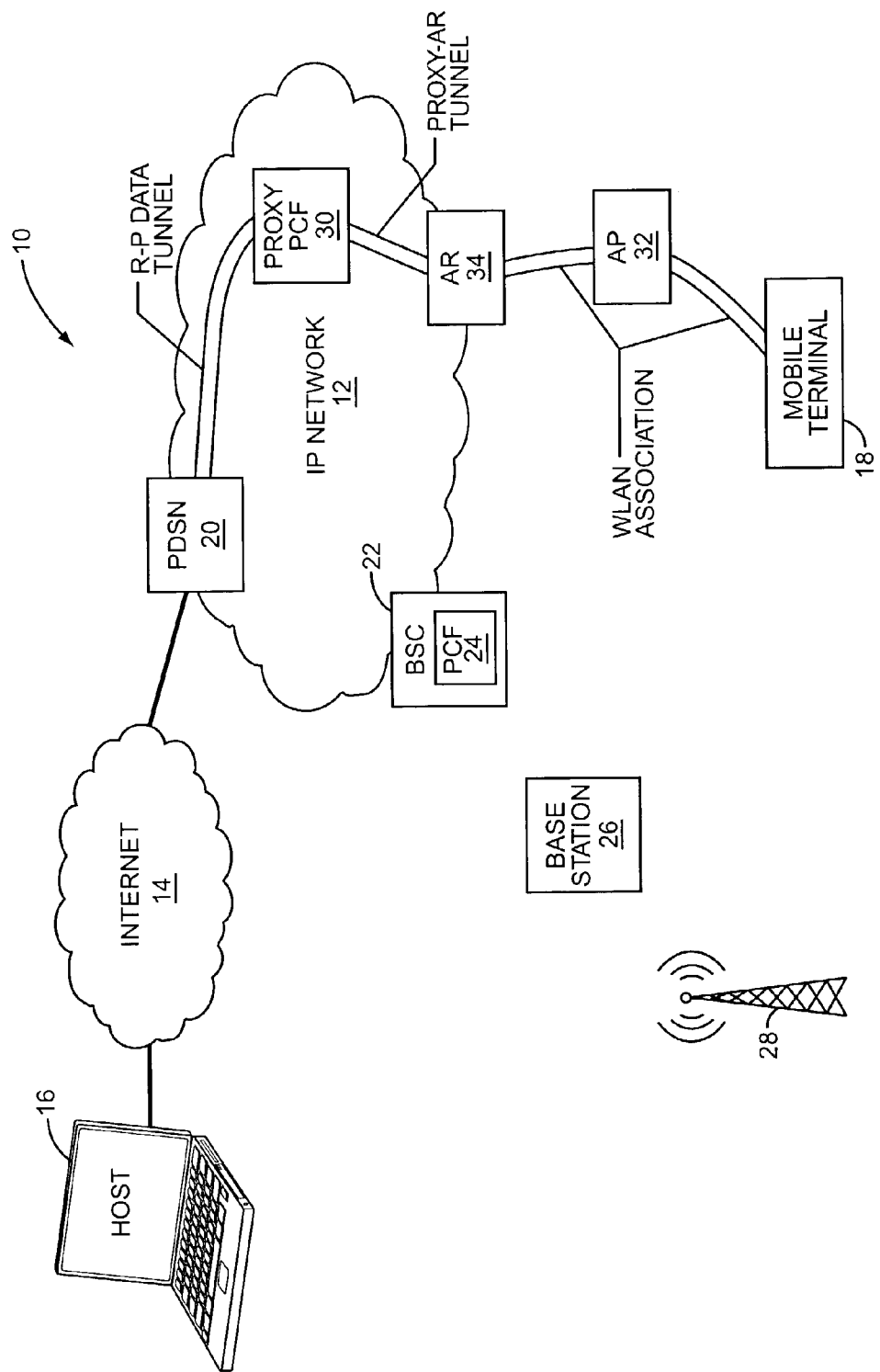
Figure 16:
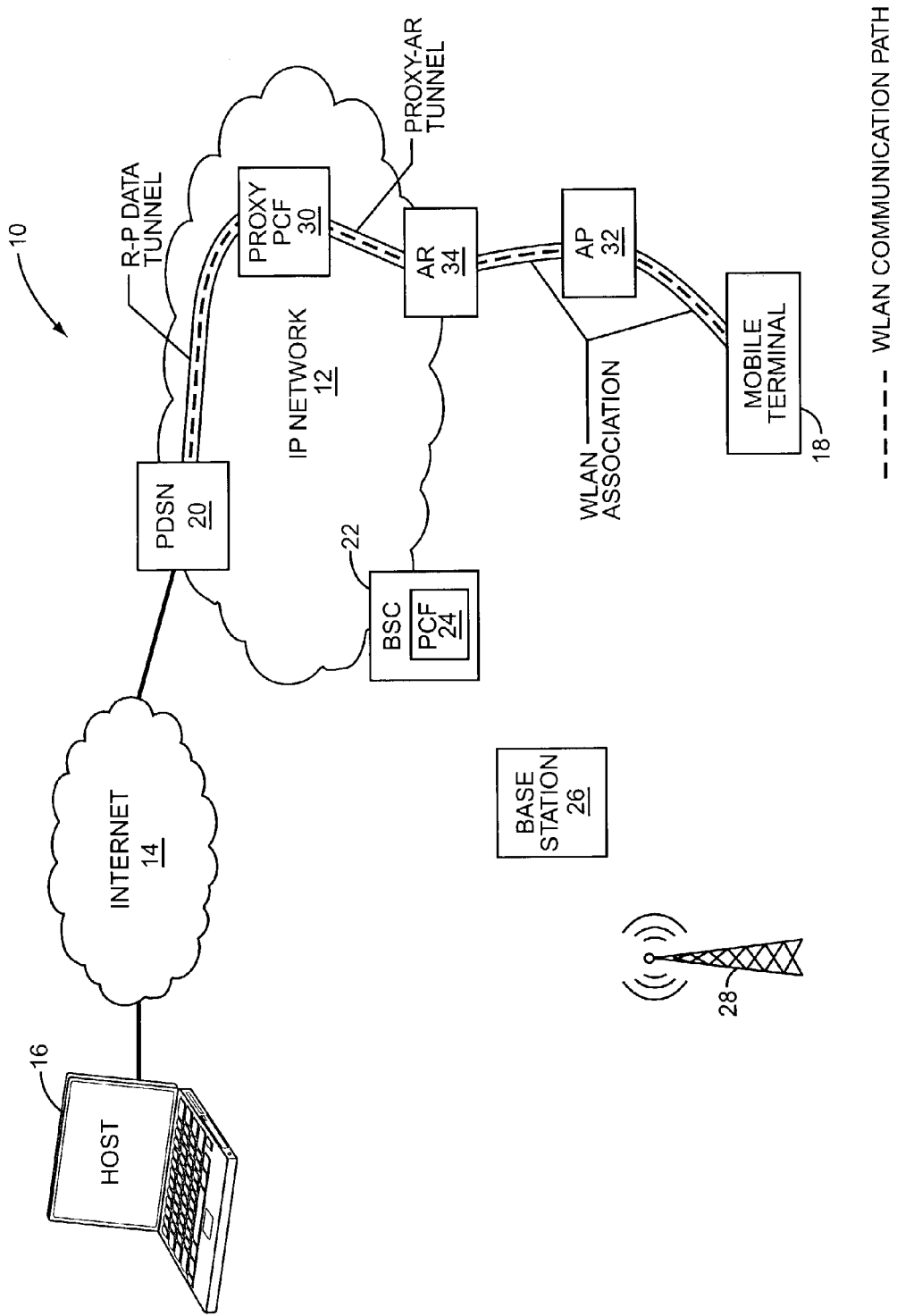

Turning now to FIG. 13, the origination of a WLAN data session from a mobile terminal 18 is depicted. Initially, a wireless data session is originated between the mobile terminal 18 and the WLAN radio interface provided by the Access Point 32 and Access Router 34. The RTSS of the mobile terminal 18 detects the data session and sends a message to the proxy PCF 30 to indicate the presence of the mobile terminal 18 in the Access Point's coverage area. The Access Router 34 performs WLAN-specific access authentication, using the 802.11x protocol. In the process, the Access Router 34 learns the cdma2000 MSID of the mobile terminal 18, preferably from a RADIUS server. In parallel, the proxy PCF 30 and the Access Router 34 set up a proxy PCF-AR tunnel for the mobile terminal's PPP frames, as illustrated in FIG. 14. The proxy PCF 30 will learn the mobile terminal's ID from the Access Router 34, and request an R-P session be set up on behalf of the mobile terminal 18 with the PDSN 20 using the mobile terminal's ID, as illustrated in FIG. 15. The proxy PCF 30 will create a mapping between the mobile terminal's ID and the R-P data session ID to create a communication path between the Access Router 34 and the PDSN 20 via the proxy PCF 30, as illustrated in FIG. 16. The mobile terminal 18 will initiate a PPP session negotiation with the PDSN 20 over the established path, in the same manner as if the data session were initiated via the cdma2000 interface. The mobile terminal 18 is then authenticated with the PDSN 20 as per the cdma2000 standard.

Accordingly, communication sessions may be set up and initiated via WLAN access or cdma2000 access, and once established, handoffs may take place as described above in an efficient and effective manner without losing the PPP session or requiring substantial overhaul of the existing cdma2000 network infrastructure. Application of the concepts of the present invention may be applied to various cellular communication technologies and wireless local area network technologies using disparate communication technologies and protocols. As an example, the concepts of the present invention may be applied to Nortel Networks Limited's Universal Mobile Telecommunications System (UMTS).

As noted above, the transition from WLAN access to cdma2000 access may be performed when the mobile terminal 18 is in a dormant or inactive state and a radio channel has not been assigned to the mobile terminal 18. In an alternative embodiment, an additional one-bit field is provided in the cdma2000 "origination" message to allow the mobile terminal 18 to indicate that an inter-technology handoff is occurring. Providing the extra field improves the performance of the handoff in the WLAN-to-cdma2000 direction. Without this additional flag, the handoff in the WLAN-to-cdma2000 direction should be performed only while the cdma2000 connection between the mobile terminal 18 and the cdma2000 network is dormant. With the flag, the handoff may take place with an active cdma2000 connection. The proposed invention works well with both simple IP and mobile IP modes of operation in the cdma2000 standard.

Figure 17:
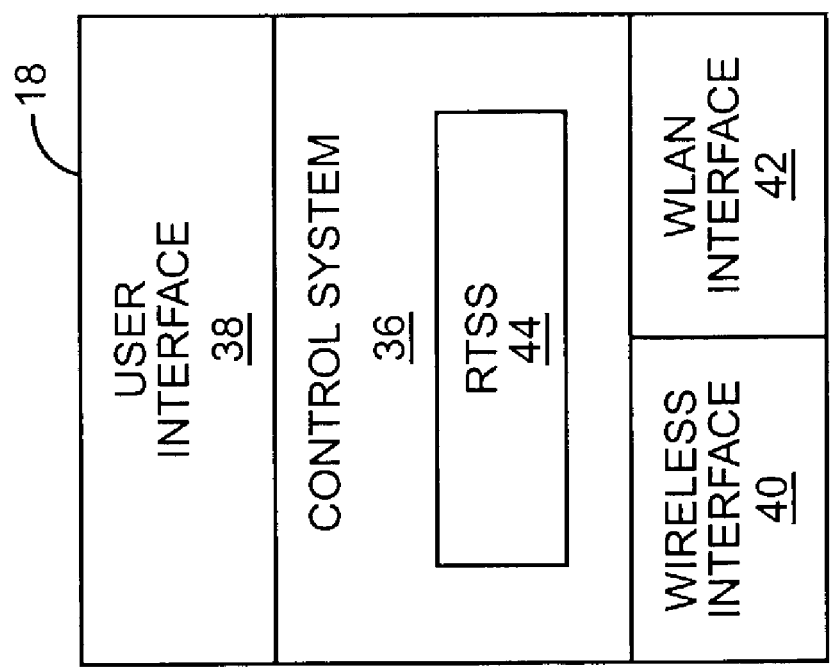
FIG. 17 is a block representation of a mobile terminal according to one embodiment of the present invention.

Turning now to FIG. 17, a block representation of a mobile terminal 18 is illustrated as having a control system 36 associated with a user interface 38, a wireless interface 40, and a WLAN interface 42. The user interface 38 may provide a bidirectional interface with a user or other system, whereas the wireless interface 40 facilitates wireless communications with the base station 26 via the antenna 28 and the WLAN interface 42 provides for wireless communications with the Access Point 32. As noted, the control system 36 will cooperate with the wireless interface 40 and the WLAN interface 42 to provide the RTSS 44, which is capable of sensing the presence of cellular and WLAN signals, to decide when a handoff should occur and initiate a handoff as described above.

Figure 18:
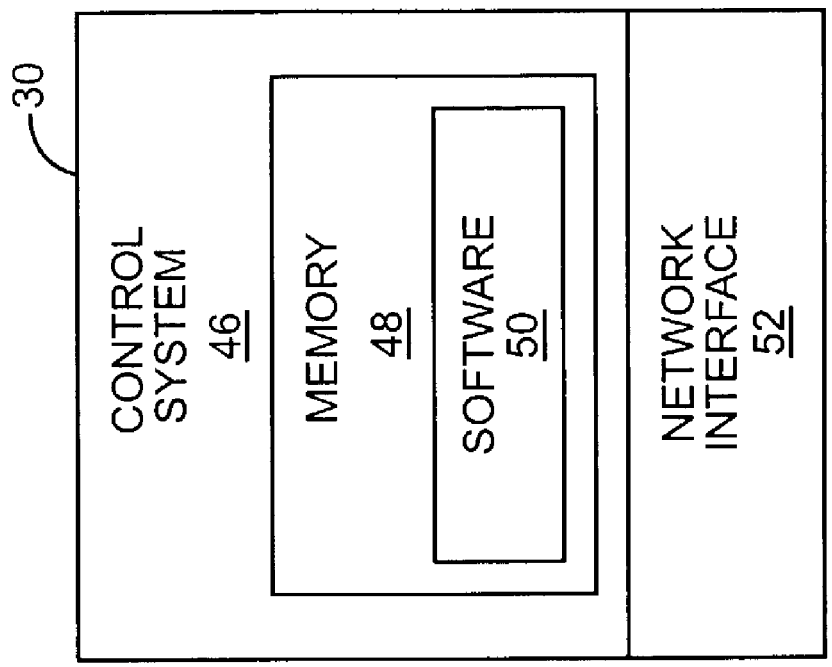
FIG. 18 is a block representation of a proxy packet control function constructed according to one embodiment of the present invention.

FIG. 18 provides a block representation of the proxy PCF 30, which will include a control system 46 having sufficient memory 48 to run software 50 to facilitate tunnels between the PDSN 20 and the Access Router 34 and otherwise control the packet or frame flow between the Access Router 34 and the PDSN 20 as described above via one or more network interfaces 52.

In summary, the present invention adds a proxy PCF 30 in an existing cellular network to facilitate access to a WLAN infrastructure, which preferably includes an Access Router 34 and an Access Point 32. Handoffs between the proxy PCF 30 and a traditional PCF 24 associated with a BSC 22 occur in traditional cdma2000 fashion, wherein the proxy PCF 30 facilitates the necessary processing of data to and from a format compatible with WLAN access. The mobile terminal 18 can independently decide when to request a handoff between the cellular access and WLAN access, and the PCF 24 of the BSC 22 will cooperate with the proxy PCF 30 to facilitate the handoff and establish the appropriate sessions with the mobile terminal 18.

Those skilled in the art will recognize improvements and modifications to the preferred embodiments of the present invention. All such improvements and modifications are considered within the scope of the concepts disclosed herein and the claims that follow.

What is claimed is:

1. A method for facilitating a handoff between a cellular network and a wireless local area network, WLAN, the method comprising:
   a) providing a communication session to a mobile terminal from a packet data serving node via a first packet control function associated with a base station controller for facilitating cellular access for the mobile terminal;
   b) determining a need for a handoff to provide the communication session to the mobile terminal via a second packet control function for facilitating WLAN access for the mobile terminal;
   c) terminating the communication session to the mobile terminal via the first packet control function;
   d) providing the communication session to the mobile terminal via the second packet control function such that the handoff of the communication session occurs from the cellular network to the WLAN;
   e) establishing a WLAN association between an access router and the mobile terminal;
   f) establishing a first data tunnel between the access router and the second packet control function; and
   g) establishing a second data tunnel between the second packet control function and the packet data serving node wherein the WLAN association, the first data tunnel, and the second data tunnel are associated to provide the communication session via the second racket control function, wherein the communication session provided via the first packet control function is facilitated by a radio channel between the mobile terminal and the base station controller associated with a third data tunnel between the first packet control function and the packet data serving node and the step of terminating the communication session further comprises removing the third data tunnel prior to establishing the second data tunnel between the second packet control function and the packet data serving node.

2. The method of claim 1 wherein packet flow for the communication session changes from between the packet data serving node and the first packet control function to between the packet data serving node and the second packet control function.

3. The method of claim 1 wherein establishing the WLAN association between the access router and the mobile terminal comprises establishing a wireless link between the mobile terminal and an access point as well as establishing a communication link between the access point and the second packet control function.

4. The method of claim 1 further comprising:
a) establishing a first radio channel between the mobile terminal and the base station controller; and
b) establishing the first data tunnel between the first packet control function and the packet data serving node wherein the first radio channel and the first data tunnel are associated to provide the communication session via the first packet control function.

5. The method of claim 1 further comprising:
a) receiving at the second packet control function a handoff signal originating from the mobile terminal to determine a need for the handoff; and
b) signaling the packet data serving node from the second packet control function to initiate the handoff by terminating the communication session to the mobile terminal via the first packet control function and providing the communication session to the mobile terminal via the second packet control function.

6. The method of claim 1 further comprising:
a) determining a need for a handoff to provide the communication session to the mobile terminal via the first packet control function;
b) terminating the communication session to the mobile terminal via the second packet control function; and
c) providing the communication session to the mobile terminal via the first packet control function such that the handoff of the communication session occurs from the WLAN to the cellular network.

7. The method of claim 1 wherein the cellular network is a cdma2000 network.

8. The method of claim 1 wherein the WLAN is an 802.11-based WLAN.

9. The method of claim 8 wherein the cellular network is a cdma2000 network.

10. The method of claim 1 wherein the communication session is at least in part facilitated using a point-to-point protocol.

11. A method for facilitating a handoff between a wireless local area network, WLAN, and a cellular network, the method comprising:

a) providing a communication session to a mobile terminal from a packet data serving node via a first packet control function for facilitating WLAN access for the mobile terminal;
b) determining a need for a handoff to provide the communication session to the mobile terminal via a second packet control function associated with a base station controller for facilitating cellular access for the mobile terminal;
c) terminating the communication session to the mobile terminal via the first packet control function; and
d) providing the communication session to the mobile terminal via the second packet control function such that the handoff of the communication session occurs from the WLAN to the cellular network;
e) establishing a first radio channel between the mobile terminal and the base station controller; and
f) packet data serving node wherein the first radio channel and the first data tunnel are associated to provide the communication session via the first racket control function, wherein the communication session provided via the first packet control function is facilitated by a WLAN association between an access router and the mobile terminal, a second data tunnel between the access router and the second packet control function, and a third data tunnel between the second packet control function and the packet data serving node; and the step of terminating the communication session further comprises removing the third data tunnel prior to establishing the second data tunnel.

12. The method of claim 11 wherein packet flow for the communication session changes from between the packet data serving node and the first packet control function to between the packet data serving node and the second packet control function.

13. The method of claim 11 further comprising:
a) establishing the WLAN association between the access router and the mobile terminal;
b) establishing the first data tunnel between the access router and the first packet control function on behalf of the mobile terminal; and
c) establishing the second data tunnel between the first packet control function and the packet data serving node wherein the WLAN association, the first data tunnel and the second data tunnel are associated to provide the communication session via the first packet control function.

14. The method of claim 13 wherein establishing the WLAN association between the access router and the mobile terminal comprises establishing a wireless link between the mobile terminal and an access point as well as establishing a communication link between the access point and the second packet control function.

15. The method of claim 11 further comprising:
a) receiving at the second packet control function an origination signal originating from the mobile terminal to determine a need for the handoff; and
b) signaling the packet data serving node from the second packet control function to initiate the handoff by terminating the communication session to the mobile terminal via the first packet control function and providing the communication session to the mobile terminal via the second packet control function.

16. The method of claim 11 the wherein the origination signal from the mobile terminal includes information indicative of the handoff from the WLAN to the cellular network.

17. The method of claim 11 further comprising:
a) determining a need for a handoff to provide the communication session to the mobile terminal via the first packet control function;
b) terminating the communication session to the mobile terminal via the second packet control function; and
c) providing the communication session to the mobile terminal via the first packet control function such that the handoff of the communication session occurs from the cellular network to the WLAN.

18. The method of claim 11 wherein the cellular network is a cdma2000 network.

19. The method of claim 11 wherein the WLAN is an 802.11-based WLAN.

20. The method of claim 19 wherein the cellular network is a cdma2000 network.

21. The method of claim 11 wherein the communication session is at least in part facilitated using a point-to-point protocol.

22. A method for facilitating a handoff between a cellular network and a wireless local area network, WLAN, comprising:
a) providing a communication session to a mobile terminal via a first packet control function;
b) determining a need for a handoff to provide the communication session to the mobile terminal via a second packet control function;
c) providing the communication session to the mobile terminal via the second packet control function, the first packet control junction facilitating the communication session between a packet data serving node and the mobile terminal via one of a cellular access or WLAN access and the second packet control function facilitating the communication session via an other of the cellular access or WLAN access;
d) establishing a WLAN association between an access router and the mobile terminal;
e) establishing a first data tunnel between the access router and the second packet control function; and
f) establishing a second data tunnel between the second racket control function and the packet data serving node wherein the WLAN association, the first data tunnel, and the second data tunnel are associated to provide the communication session via the second packet control function,
wherein the communication session provided via the first packet control function is facilitated by a radio channel between the mobile terminal and the base station controller associated with a third data tunnel between the first packet control function and the racket data serving node and terminating the communication session by removing the third data tunnel prior to establishing the second data tunnel between the second packet control function and the racket data serving node.

23. The method of claim 22 wherein the cellular network is a cdma2000 network.

24. The method of claim 22 wherein the WLAN is an 802.11-based WLAN.

25. The method of claim 24 wherein the cellular network is a cdma2000 network.

26. The method of claim 22 wherein the communication session is at least in part facilitated using a point-to-point protocol.

27. A system for facilitating a handoff between a wireless local area network, WLAN, and a cellular network, the system comprising:
a) at least one network interface; and
b) a control system associated with the at least one network interface and adapted to:
i) determine a need for a handoff to provide a communication session to a mobile terminal, which is being provided the communication session via a first packet control function associated with a base station controller for facilitating cellular access for the mobile terminal;
ii) send a message to a packet data serving node to facilitate a handoff from the first packet control function;
iii) establish a WLAN association between an access router and the mobile terminal;
iv) establish a first data tunnel between the access router and a second packet control function; and
v) establish a second data tunnel between the second packet control function and the packet data serving node wherein the WLAN association, the first data tunnel, and the second data tunnel are associated to provide the communication session via the second packet control function,
wherein the communication session provided via the first packet data function is facilitated by a radio channel between the mobile terminal and the base station controller associated with a third data tunnel between the first packet control function and the packet data serving node, and terminating the communication session by removing the third data tunnel prior to establishing the second data tunnel between the second packet control function and the packet data serving node.

28. The system of claim 27 wherein once the WLAN association with the mobile terminal is established, the control system is further adapted to cooperate with the packet data serving node to terminate the first data tunnel with the packet data serving node to facilitate a handoff to the packet control function.

29. The system of claim 27 wherein the control system is adapted to establish the WLAN association by establishing a communication link with the access router, which further establishes a wireless link with an access point providing a wireless link with the mobile terminal.

30. The system of claim 27 wherein the control system determines a need for the handoff upon receiving an origination signal originating from the mobile terminal.

* * * * *

UNITED STATES PATENT AND TRADEMARK OFFICE
CERTIFICATE OF CORRECTION

PATENT NO. : 7,583,632 B2
APPLICATION NO. : 10/324551
DATED : September 1, 2009
INVENTOR(S) : Janevski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1899 days.

Signed and Sealed this

Fourteenth Day of September, 2010

David J. Kappos
*Director of the United States Patent and Trademark Office*